(12) United States Patent
Ellefson et al.

(10) Patent No.: US 6,642,641 B2
(45) Date of Patent: Nov. 4, 2003

(54) APPARATUS FOR MEASURING TOTAL PRESSURE AND PARTIAL PRESSURE WITH COMMON ELECTRON BEAM

(75) Inventors: Robert E. Ellefson, Manlius, NY (US); Louis C. Frees, Manlius, NY (US)

(73) Assignee: Inficon, Inc., East Syracuse, NY (US)

( * ) Notice: Subject to any disclaimer, the term of this patent is extended or adjusted under 35 U.S.C. 154(b) by 82 days.

(21) Appl. No.: 09/838,361

(22) Filed: Apr. 19, 2001

(65) Prior Publication Data

US 2002/0153820 A1 Oct. 24, 2002

(51) Int. Cl.[7] .................................................. H01J 49/40
(52) U.S. Cl. ...................... 313/362.1; 250/282; 250/423
(58) Field of Search ............................. 313/362.1, 230; 250/423, 424, 282, 287, 288

(56) References Cited

U.S. PATENT DOCUMENTS

| | | | |
|---|---|---|---|
| 3,924,134 A | * 12/1975 | Uman et al. | ............. 250/423 R |
| 3,992,625 A | * 11/1976 | Schmidt et al. | ......... 204/157.22 |
| 4,240,007 A | * 12/1980 | Dreyfus et al. | ...... 313/105 CM |
| 4,749,912 A | * 6/1988 | Hara et al. | ............... 250/423 R |
| 5,101,110 A | * 3/1992 | Matsudo et al. | ............ 250/427 |
| 5,107,170 A | * 4/1992 | Ishikawa et al. | ......... 313/362.1 |
| 5,111,053 A | * 5/1992 | Suzuki | .................... 250/423 R |
| 5,539,274 A | * 7/1996 | Araki et al. | ............. 313/362.1 |
| 5,808,308 A | 9/1998 | Holkeboer | |
| 5,850,084 A | * 12/1998 | Holkeboer | ............... 250/423 R |
| 5,889,281 A | * 3/1999 | Holkeboer et al. | ......... 250/282 |
| 5,942,854 A | * 8/1999 | Ryoji et al. | ............. 315/111.21 |

FOREIGN PATENT DOCUMENTS

DE          196 42 099 A1          4/1998

* cited by examiner

Primary Examiner—Sandra O'Shea
Assistant Examiner—Dalei Dong
(74) Attorney, Agent, or Firm—Wall Marjama & Bilinski LLP

(57) ABSTRACT

An apparatus for determining both total and partial pressures of a gas using one common electron beam includes a partial pressure ionization region and a total pressure ionization region separated by a grid or aperture. A filament produces a plurality of electrons which are focused into an electron beam by a repeller and an aperture or an anode. The interaction between the electron beam and molecules of the gas within the partial pressure and total pressure regions produces first and second ion streams. A focus plate is biased such that the first ion stream is directed to an analyzer which calculates the partial pressure of the gas. An ion collector collects the ions from the second ion stream, where the resulting reference current is used to determine the total pressure of the gas.

19 Claims, 3 Drawing Sheets

APPARATUS FOR MEASURING TOTAL PRESSURE AND PARTIAL PRESSURE WITH COMMON ELECTRON BEAM

FIELD OF THE INVENTION

This invention pertains to the field of ionizing gas samples for mass spectrometers, and in particular to using one electron beam traversing two ionization regions to provide separate streams of ions for independently measuring both total pressure and partial pressure of the gas sample.

BACKGROUND OF THE INVENTION

Many scientific instruments, such as mass spectrometers, require generation of ions so that the ions may be accelerated or otherwise input into the instrument for sample identification, measurement, and other purposes. For a quadrupole residual gas analyzer, it is desirable to indicate the ionization current as a total pressure measurement, in addition to filtering the ion current to indicate specific ion species.

A conventional ion source includes a filament acting as an electron emitter, an ion volume containing rarified gas, and an ion accelerator. Electrons from the filament enter the ion volume through an opening in an ionization chamber surrounding the ion volume to ionize gas molecules within the ion volume. The ion accelerator draws the resulting ions out of the ion volume and focuses them into a beam of ions suitable for injection into the quadrupole filter or other mass analysis instrument.

When using such a device, it is usually desirable to have an accurate measurement of the ion stream or ion current being supplied to the quadrupole mass filter or other instrument. One conventional method for measuring ion current is typically to measure an ion current at the ion accelerator, since a portion of the ion stream impacts on the ion accelerator. However, this method has several drawbacks. The principal drawback is a change in ion fraction impacting acceleration as the mass range is scanned. For example, the ion accelerator often has electrical leakage. The measurement may also be affected by stray currents from the ionization process.

Another conventional method is to place an ion collector in the path of the ion stream. However, this method has the drawback of interfering with the ion stream. In addition, in both of the above methods, and in others where only a fraction of the ion stream is measured, it is difficult to judge the exact useable ion current by measuring the "test" fraction, because as the intensity of the total ion stream varies, the ratio between the "utilizable" portion of the ion stream and the "test" portion striking the measurement collector may vary in unknown ways.

SUMMARY OF THE INVENTION

Briefly stated, an apparatus for determining both total and partial pressures of a gas using one common electron beam includes a partial pressure ionization region and a total pressure ionization region separated by a grid or aperture. A filament produces a plurality of electrons which are focused into an electron beam by a repeller and an anode. The interaction between the electron beam and molecules of said gas within the partial pressure and total pressure regions produces first and second ion streams. A focus plate is biased such that the first ion stream is directed to an analyzer which calculates the partial pressure of the gas. An ion collector collects the ions from the second ion stream, where the resulting reference current is used to determine the total pressure of the gas.

According to an embodiment of the invention, an apparatus for determining a total pressure of a gas includes an ionization chamber; the ionization chamber having first and second ionization regions, wherein a boundary between the regions is defined by an anode grid or aperture; means for producing an electron beam passing through the first and second ionization regions, whereby an interaction between the electron beam and molecules of the gas within the ionization chamber produce first and second ion streams from a same gas density; means for directing the first ion stream to an analyzer; and means for directing the second ion stream to an ion collector.

According to an embodiment of the invention, an apparatus for determining a total pressure of a gas includes an ionization chamber; the ionization chamber having first and second ionization regions, wherein a boundary between the regions is defined by an anode grid or aperture; a filament for producing a plurality of electrons; a repeller; the repeller and anode operatively associated to focus the plurality of electrons into an electron beam passing through the first and second ionization regions, whereby an interaction between the electron beam and molecules of the gas within the ionization chamber produce first and second ion streams from a same gas density; a focus plate biased such that the first ion stream is directed to an analyzer, wherein the analyzer includes means for calculating at least one partial pressure of the gas within the ionization chamber; an ion collector biased such that the second ion stream is directed to an ion collector; means for measuring a reference current produced by the second ion stream at the ion collector; and means, using the reference current, for calculating the total pressure of the gas within the ionization chamber.

According to an embodiment of the invention, a method for determining a total pressure of a gas includes (a) providing an ionization chamber, the ionization chamber having first and second ionization regions, wherein a boundary between the regions is defined by an anode grid or aperture; (b) producing an electron beam passing through the first and second ionization regions, whereby an interaction between the electron beam and molecules of the gas within the ionization chamber produce first and second ion streams from a same gas density; (c) directing the first ion stream to an analyzer; and (d) directing the second ion stream to an ion collector.

DETAILED DESCRIPTION OF THE PREFERRED EMBODIMENT

Figure 1:
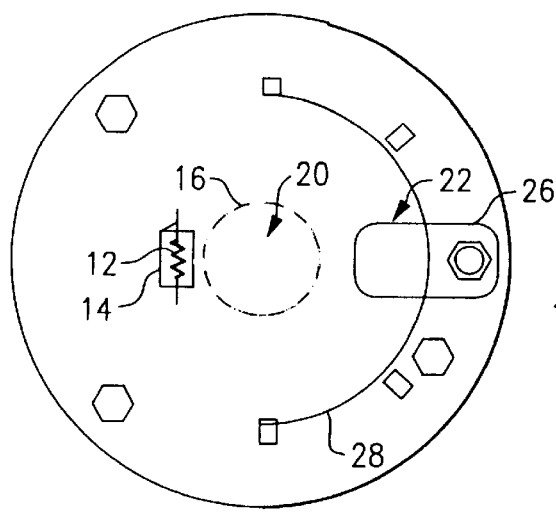
FIG. 1 shows a partial cross-sectional view of an embodiment of the present invention.
Figure 2:
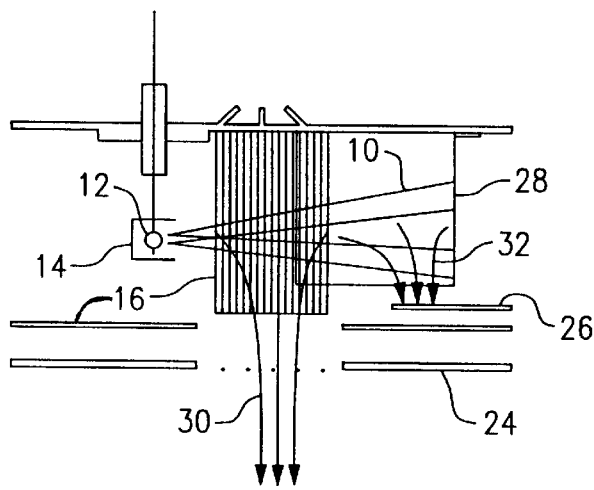
FIG. 2 shows a side view of a portion of the embodiment of FIG. 1.

Referring to FIGS. 1–2, an electron beam 10 is emitted from a filament 12. The electrons in electron beam 10 are focused by a three-sided repeller 14 which is mounted such that a center of filament 12 is at the center of diagonals drawn from the corners of repeller 14. Repeller 14 is connected to the negative side of filament 12, thus making repeller 14 more negative than the potential of emitted electrons by an amount equal to the filament voltage with respect to the negative lead at the point the electron is emitted. This is approximately one-half the voltage across the filament (~1.5 V).

The electrons in electron beam 10 are drawn to an anode 16 by a voltage that is positive with respect to filament 12. Anode 16 is preferably biased at 70 V. Anode 16 separates a first region 20 from a second region 22. Electron beam 10 forms ions in both the first and second regions 20, 22. A plurality of ions 30 from first region 20 are extracted by a focus plate 24 and directed to a mass analysis device, where they form ion currents proportional to pressures of gas components in region 20. A plurality of ions 32 from second region 22 are collected by an ion collection device, such as a collector plate 26, to produce a current proportional to the total pressure of gas components in second region 22.

The electrons in electron beam 10 continue through first and second regions 20, 22 and impact on a beam stop 28. Anode 16 and beam stop 28 together function as an anode for electron beam 10, resulting in the acceleration of electrons in electron beam 10 being perpendicular to the equipotential lines established by the structure, thus resulting in a focused beam.

Figure 3:
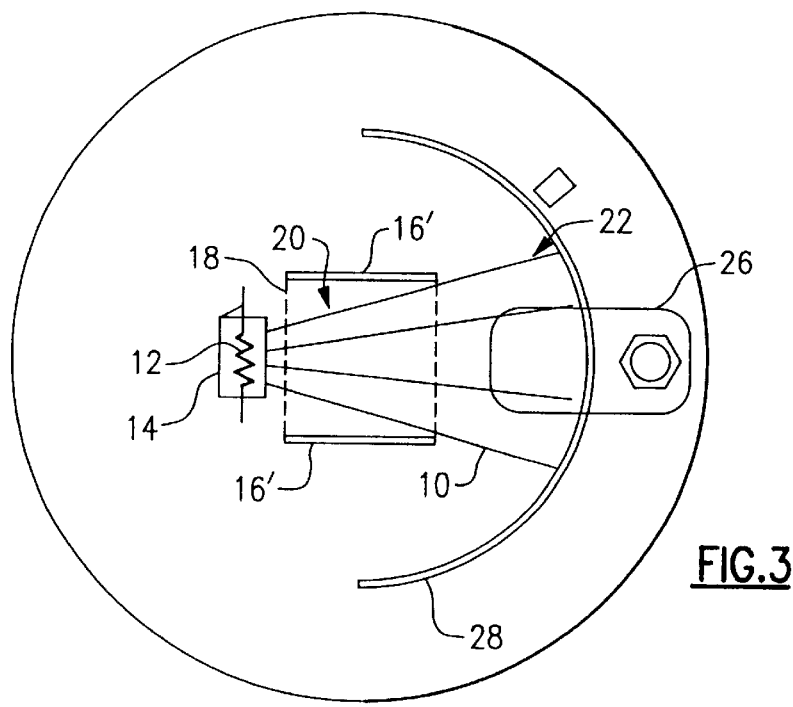
FIG. 3 shows a partial cross-sectional view of an embodiment of the present invention.

Referring to FIG. 3, an embodiment of the invention includes a square anode 16' that more efficiently draws electrons from filament 12 through a flat grid 18 on an entrance side of anode 16'. The higher efficiency for electrons in the anode 16' region results in increased ion formation in first and second regions 20, 22.

Figure 4:
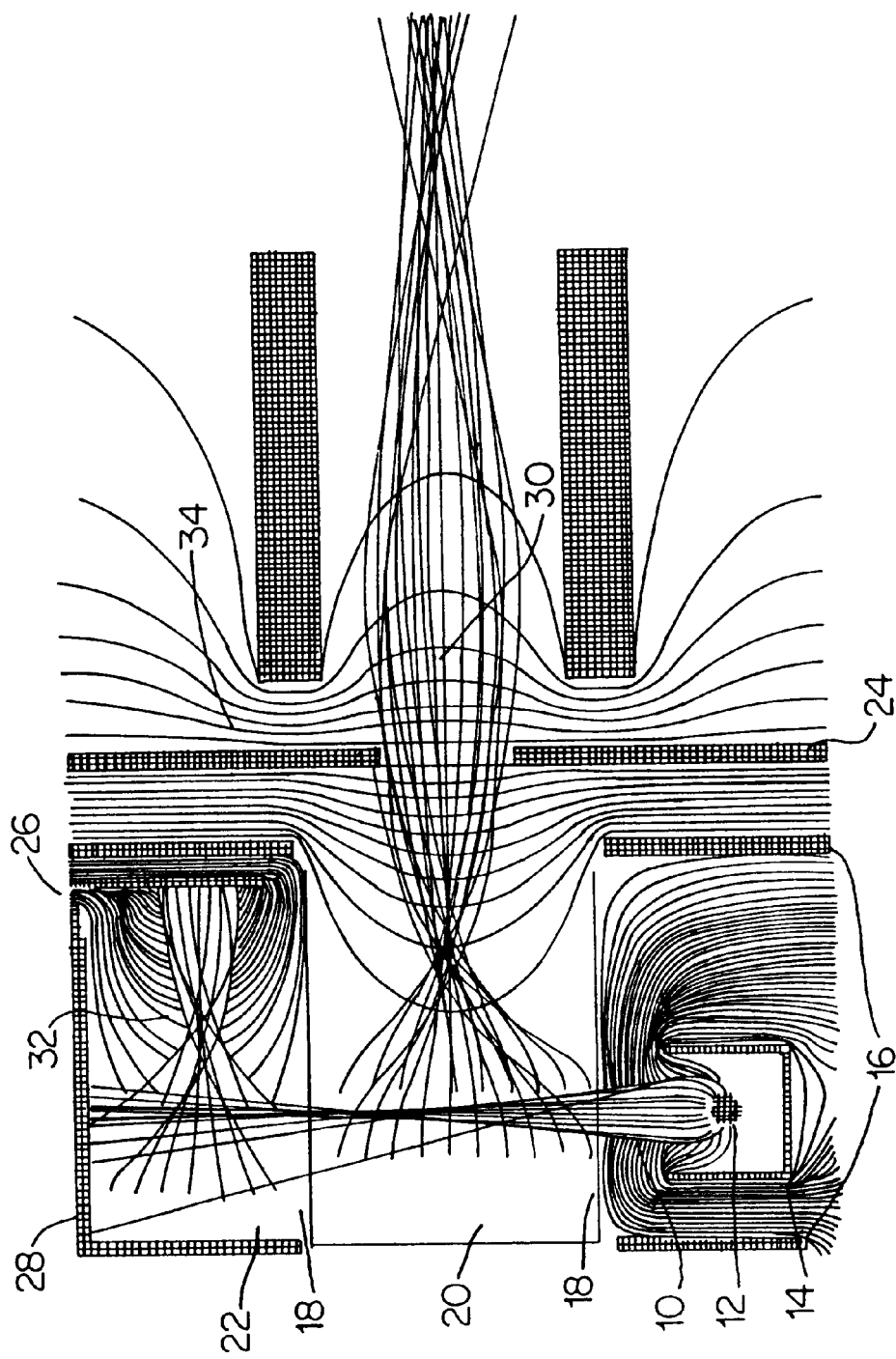
FIG. 4 shows an ion optics plot of electron and ion trajectories according to the embodiment of FIG. 3.

Referring to FIG. 4, an ion optics plot of electron and ion trajectories is shown. The accelerations of the electrons are perpendicular to the equipotential lines 34 established by the structure which results in a focused beam. Ions formed in the partial pressure ionization region (first region 20) by electron beam 10 are drawn toward focus plate 24 and form the stream of ions 30 for separation by a mass analyzer (not shown). Ions 32 formed in the total pressure ionization region (second region 22) by the continuation of electron beam 10 are collected by total pressure collector plate 26.

Figure 5:
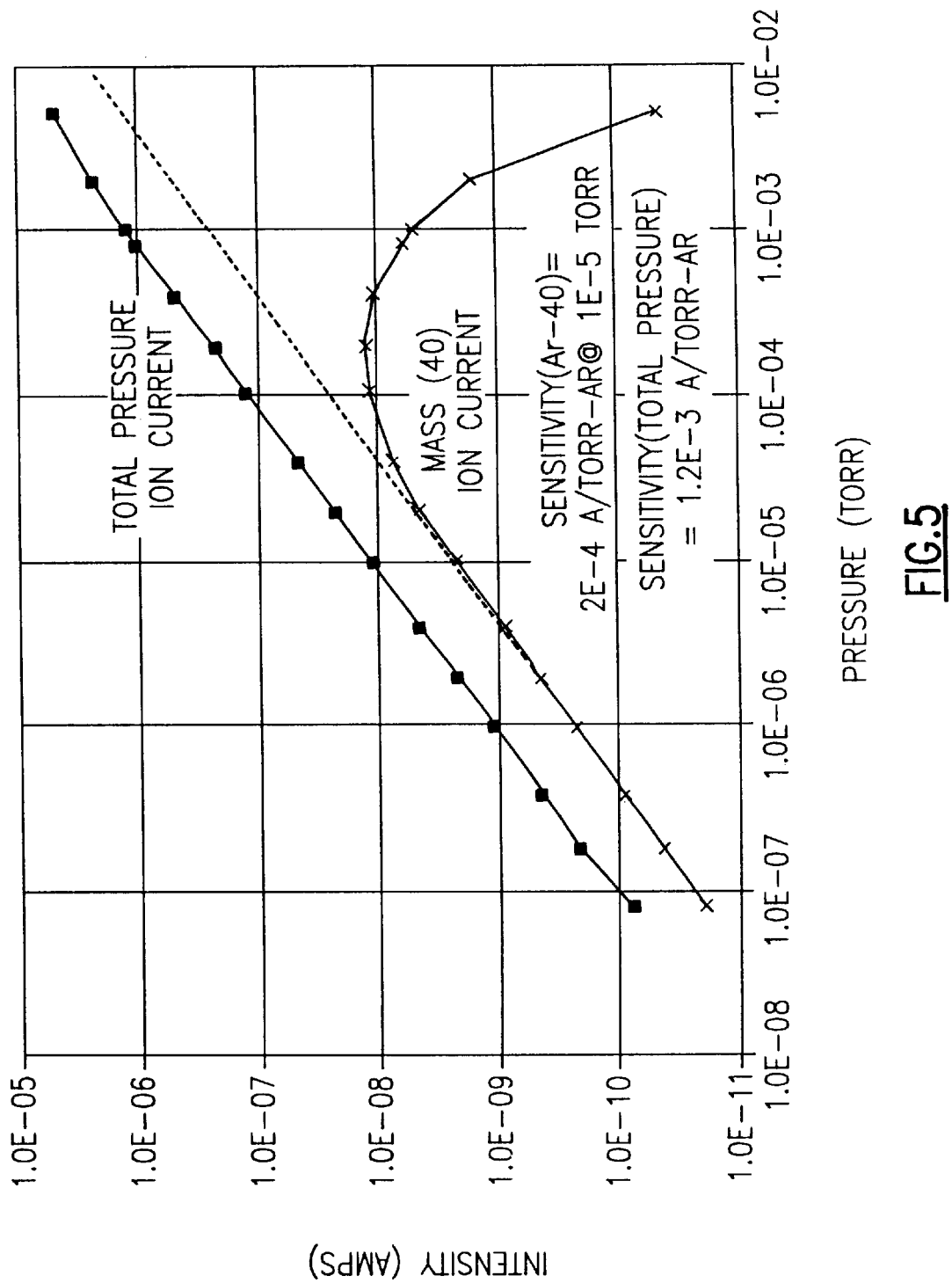
FIG. 5 shows a total pressure current and Ar-40 ion current as a function of Ar pressure as measured by the present invention.

Referring to FIG. 5, the total pressure ion current and mass analyzed ion current produced with 1000 uA of electron emission are shown for a wide range of Ar gas pressure. The total pressure ion current responds linearly with pressure over the range. The Mass 40 ion current responds linearly to Ar pressure up to 2 E-5 Torr. At higher pressures the ion current is attenuated from the expected ion current due to gas scattering by a factor $\exp[-k\,P]$ where k is a constant and P is the process pressure.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An apparatus for determining a total pressure of a gas, comprising:
   an ionization chamber;
   said ionization chamber having adjacent first and second ionization regions, wherein a boundary between said adjacent ionization regions is defined by one of an aperture and an anode grid;
   means for producing an electron beam passing through each of said first and second ionization regions, whereby an interaction between said electron beam and molecules of said gas within said ionization chamber produces first and second ion streams from a same gas density;
   means for directing said first ion stream from said first region to an analyzer; and
   means for directing said second ion stream from said second region to an ion collector.

2. An apparatus according to claim 1, further comprising:
   means for collecting said second ion stream at said ion collector;
   means for measuring a reference current produced by said second ion stream at said ion collector; and
   means, using said reference current, for calculating said total pressure of said gas within said ionization chamber.

3. An apparatus according to claim 2, wherein said analyzer includes means for calculating at least one partial pressure of said gas within said ionization chamber.

4. An apparatus according to claim 3, further comprising an electron beam stop which collects substantially all electrons not interacting with said gas molecules.

5. An apparatus according to claim 4, wherein said means for producing an electron beam comprises:
   emission means for emitting a plurality of electrons; and
   focusing means for focusing said plurality of electrons into said electron beam.

6. An apparatus according to claim 1, wherein said means for producing an electron beam comprises:
   emission means for emitting a plurality of electrons; and
   focusing means for focusing said plurality of electrons into said electron beam.

7. An apparatus according to claim 6, wherein said focusing means includes a repeller having three sides and an opening for said electron beam to pass through.

8. An apparatus according to claim 1, wherein said anode grid has a rectangular cross-section.

9. An apparatus according to claim 8, wherein said anode grid includes a flat portion that is oriented perpendicular to said electron beam.

10. An apparatus according to claim 1, wherein said electron beam passes through said first ionization region before said electron beam passes through said second ionization region.

11. An apparatus according to claim 1, wherein said electron beam passes through said second ionization region before said electron beam passes through said first ionization region.

12. An apparatus according to claim 1, wherein said collector is arranged parallel to said analyzer.

13. An apparatus for determining a total pressure of a gas, comprising:
   an ionization chamber;
   said ionization chamber having adjacent first and second ionization regions, wherein a boundary between said regions is defined by one of an aperture and an anode grid;
   a filament for producing a plurality of electrons;
   a repeller;
   said repeller and anode operatively associated to focus said plurality of electrons into an electron beam passing through each of said first and second ionization regions, whereby an interaction between said electron beam and molecules of said gas within said ionization chamber produces first and second ion streams from a same gas density;

a focus plate biased such that said first ion stream is directed from said first ionization region to an analyzer, wherein said analyzer includes means for calculating at least one partial pressure of said gas within said ionization chamber;

an ion collector biased such that said second ion stream is directed from said second ionization region to an ion collector;

means for measuring a reference current produced by said second ion stream at said ion collector; and means, using said reference current, for calculating said total pressure of said gas within said ionization chamber.

14. An apparatus according to claim 13, wherein said anode grid has a rectangular cross-section.

15. An apparatus according to claim 14, wherein said anode grid includes a flat portion that is oriented perpendicular to said electron beam.

16. An apparatus according to claim 13, wherein said collector is arranged in parallel to said analyzer.

17. A method for determining a total pressure of a gas, comprising the steps of:

providing an ionization chamber, said ionization chamber having adjacent first and second ionization regions, wherein a boundary between said adjacent ionization regions is defined by one of an aperture and an anode grid;

producing an electron beam passing through each of said adjacent first and second ionization regions, whereby an interaction between said electron beam and molecules of said gas within said ionization chamber produces first and second ion streams from a same gas density;

directing said first ion stream from said first ionization region to an analyzer; and directing said second ion stream from said second adjacent ionization region to an ion collector.

18. A method according to claim 17, further comprising the steps of:

collecting said second ion stream at said ion collector;

measuring a reference current produced by said second ion stream at said ion collector; and calculating, using said reference current, said total pressure of said gas within said ionization chamber.

19. An apparatus according to claim 17, including the step of arranging said analyzer in parallel alignment with said collector.

* * * * *